US008818457B2

(12) United States Patent
Besoli et al.

(10) Patent No.: US 8,818,457 B2
(45) Date of Patent: Aug. 26, 2014

(54) ANTENNA HAVING POLARIZATION DIVERSITY

(75) Inventors: Alfred Grau Besoli, Irvine, CA (US); Nick Alexopoulos, Irvine, CA (US); Jesus Alfonso Casteneda, Los Angeles, CA (US)

(73) Assignee: Broadcom Corporation, Irvine, CA (US)

( * ) Notice: Subject to any disclaimer, the term of this patent is extended or adjusted under 35 U.S.C. 154(b) by 400 days.

(21) Appl. No.: 13/239,038

(22) Filed: Sep. 21, 2011

(65) Prior Publication Data

US 2013/0072136 A1 Mar. 21, 2013

(51) Int. Cl.

*H04M 1/00* (2006.01)
*H01Q 3/26* (2006.01)
*H01Q 1/08* (2006.01)
*H01Q 1/22* (2006.01)
*H01Q 1/24* (2006.01)
*H01Q 3/44* (2006.01)
*H01Q 5/00* (2006.01)

(52) U.S. Cl.

CPC ............ *H01Q 3/2629* (2013.01); *H01Q 1/081* (2013.01); *H01Q 1/2258* (2013.01); *H01Q 1/243* (2013.01); *H01Q 1/244* (2013.01); *H01Q 1/245* (2013.01); *H01Q 3/446* (2013.01); *H01Q 5/0027* (2013.01); *H01Q 1/2275* (2013.01)

USPC .................. 455/562.1; 455/556.1; 455/575.7; 455/121; 343/700; 343/702; 343/730

(58) Field of Classification Search

CPC .... H04W 16/28; H04W 16/24; H04B 7/0617; H04B 7/0408; H01Q 1/246; H01Q 5/0017; H01Q 5/0065; H01Q 9/0435; H01Q 21/245

USPC .................. 455/562.1, 67.11, 73, 127.2, 129, 455/575.7, 575.1, 103, 101, 277.2, 450, 70; 343/749, 700, 702, 767, 895, 819, 727, 343/866, 867, 378, 382, 383, 873; 361/759

See application file for complete search history.

(56) References Cited

U.S. PATENT DOCUMENTS 5,943,016 A * 8/1999 Snyder et al. .......... 343/700 MS
6,201,501 B1 * 3/2001 Arkko et al. .................. 343/702
6,650,294 B2 * 11/2003 Ying et al. ............ 343/700 MS
6,801,790 B2 * 10/2004 Rudrapatna ................ 455/562.1
6,823,177 B1 * 11/2004 Lucidarme .................... 455/103
7,830,321 B2 * 11/2010 Fukuchi ........................ 343/767
8,027,315 B2 * 9/2011 Urquhart et al. .............. 370/334
8,154,451 B2 * 4/2012 Zimmerman ................. 342/361
8,165,637 B2 * 4/2012 Park et al. .................. 455/562.1
8,224,271 B2 * 7/2012 Persson et al. ............ 455/127.2
8,340,197 B2 * 12/2012 Uhl et al. ...................... 375/259
2002/0075187 A1 * 6/2002 McKivergan ................. 343/702
2002/0089456 A1 * 7/2002 Hamada ........................ 343/702
2003/0098812 A1 * 5/2003 Ying et al. .................... 343/702
2004/0008153 A1 * 1/2004 Lamensdorf et al. ......... 343/895
2007/0042787 A1 * 2/2007 Hsu et al. ...................... 455/450
2007/0182658 A1 * 8/2007 Ozden .......................... 343/866
2008/0191946 A1 * 8/2008 Gustaf ................... 343/700 MS
2008/0218417 A1 * 9/2008 Gillette .................. 343/700 MS
2012/0026704 A1 * 2/2012 Diclemente ................... 361/759
2012/0032862 A1 * 2/2012 Ying ............................ 343/749
2012/0275499 A1 * 11/2012 Anreddy et al. .............. 375/219
2013/0072125 A1 * 3/2013 Yoon et al. ................. 455/67.11

* cited by examiner

*Primary Examiner* — Tan Trinh

(74) *Attorney, Agent, or Firm* — Brinks Gilson & Lione

(57) ABSTRACT

A compact antenna includes a main antenna patch. A first feed point and a second feed point connect with the main antenna patch to provide current in the main antenna. Excitation of the first feed point produces polarization in a first direction along the main antenna patch and excitation of the second feed point produces polarization in a second direction different from the first direction.

20 Claims, 7 Drawing Sheets

| Name | Theta | Ang | Mag |
|---|---|---|---|
| m1 | 360.0000 | -0.0000 | 5.5927 |
| m3 | 360.0000 | -0.0000 | -12.4965 |
| m4 | 178.0000 | 178.0000 | -8.9382 |

HFSSDesign1

| Curve Info |
|---|
| ——— dB(GainPhi) |
| HFSS_Setup_4: Sweep1 |
| Freq='62GHz' Phi='90deg' |
| - - - - dB(GainTheta) |
| HFSS_Setup_4: Sweep1 |
| Freq='62GHz' Phi='90deg' |

| Name | Theta | Ang | Mag |
|---|---|---|---|
| m1 | 360.0000 | -0.0000 | 5.5927 |
| m2 | 360.0000 | -0.0000 | -12.4965 |
| m3 | 178.0000 | 178.0000 | -8.7235 |

| Curve Info |
|---|
| —— dB(GainPhi) HFSS_Setup_4: Sweep1 Freq='62GHz' Phi='0deg' |
| ---- dB(GainTheta) HFSS_Setup_4: Sweep1 Freq='62GHz' Phi='0deg' |

ANTENNA HAVING POLARIZATION DIVERSITY

TECHNICAL FIELD

This disclosure relates to antennas. This disclosure also relates to polarized antennas such as compact broadband polarized antennas for 60 GHz, which may be used in switched polarization diversity systems.

BACKGROUND

The wireless communications industry is experiencing rapid growth. In one example, wireless operators may be searching for new solutions to be implemented into the wireless communication networks to provide broader bandwidth, better quality and new services. The use of millimeter wave frequency band may be considered a promising technology for broadband wireless. The Federal Communications Commission (FCC) released a set of rules governing the use of spectrum between 57 and 66 GHz. The large bandwidth coupled with high allowable transmit power leads to high possible data rates.

BRIEF DESCRIPTION OF THE DRAWINGS

The system may be better understood with reference to the following drawings and description. In the figures, like reference numerals designate corresponding parts throughout the different views.

DETAILED DESCRIPTION

The discussion below describes an antenna, such as a broadband antenna, having diversity of polarization directions. With 60 GHz wireless systems, often there is no clear line-of-sight between a transmitter and a receiver of the wireless systems, which may cause a reduction in quality and reliability of a wireless link. The interior of buildings, for example, include many obstacles to the wireless signals, such as walls, partitions, ceilings, and furnishings, which are surfaces to reflect the signals. Each bounce can introduce phase shifts, time delays, attenuations, and distortions that can interfere with one another at the receiving antenna.

In addition, some 60 GHz systems may suffer from a problem of performance degradation when the polarization of transmitting and/or receiving devices is misaligned. In many applications, it may be difficult to know a direction of polarization of the antenna, which could vary depending on how the manufacturer assembles a device, the way the user holds the device, etc. A drop of 20 dB can be observed on the received signal-to-noise ratio (SNR) when such misalignment occurs, which can cause drop-outs, lost and missed connections.

For purposes of explanation, the antenna allows endpoints to communicate wirelessly, such as using the IEEE 802.15.3 and 802.15.4 standards, according to the WLAN and WPAN 60 GHz band specifications, or according to other wireless standards. The antenna helps achieve a robust wireless propagation link between transmitting and receiving communicating endpoints. For example, the antenna may be used to align polarization of antennas at the transmitting or receiving endpoints. The antennas may be implemented both as standalone antennas and in the construction of switched-polarization diversity schemes for 60 GHz antenna array designs.

Figure 1:
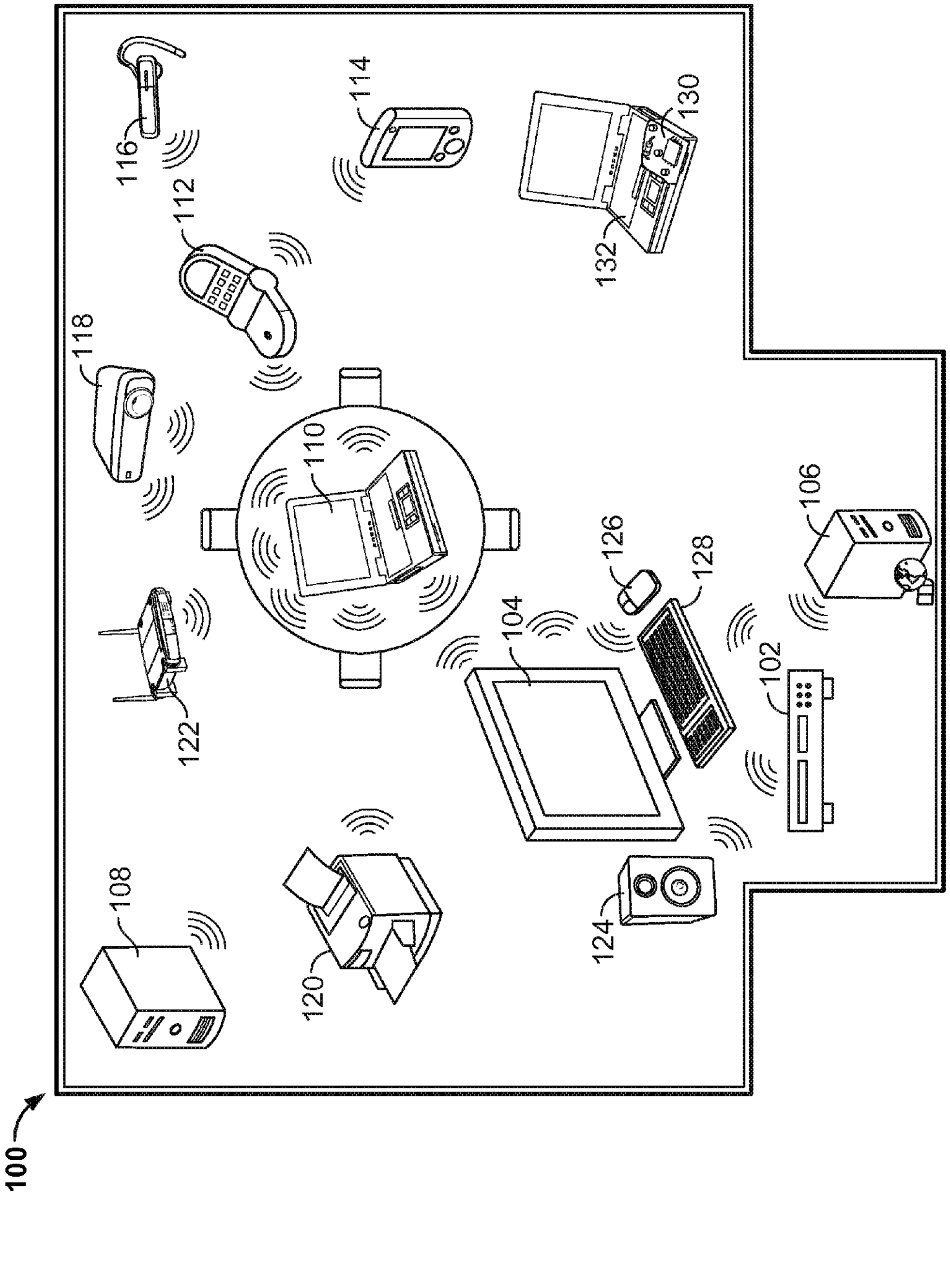
FIG. 1 shows one example of an environment in which the antenna is used to wirelessly connect various endpoints with one another.

FIG. 1 shows one example of an environment 100 in which the antenna is used to wirelessly connect endpoints with one another. In general, the antenna may function as a transmitter (TX) and a receiver (RX) (e.g., transceiver), to provide a communication link between the endpoints. Endpoints may be found in various contexts, including the home, business, public spaces and automobile. In this example, the environment 100 is a room. The environment 100 includes multiple endpoints that may communicate wirelessly with some or all the other endpoints. In FIG. 1, a media player 102 (e.g., a Blu-Ray™) streams high definition video and audio content to a television (TV) 104. Similarly, a home media server 106 with a wireless network interface streams audio (e.g., MP3 content) and video (e.g., MP4, AVI, or MPEG content) to the TV 104 and to other endpoints in the environment 100.

Other examples of endpoints in the environment 100 include an application and file server 108 that is in communication with the laptop computer 110. Additional or alternative computing devices may be present in the environment 100 such as desktop and tablet computers, which may also act as endpoints. The laptop computer 110 wirelessly communicates with peripheral devices, such as a projector 118 and a printer 120. The media player 102 is also shown wirelessly communicating with the projector 118. The laptop computer 110 may also wirelessly exchange information with other endpoints such as a gateway or network router 122.

In FIG. 1, a cell phone, personal digital assistant, portable email device or smartphone 112 and a portable gaming system 114 wirelessly exchange information (e.g., emails, text messages or video game saved game files). The smartphone 112 may also wireless connect to a radio receiver or other audio device such as earpiece 116. Other endpoints may exist in the environment 100, and different environments may include additional, fewer, or different endpoints. For example, the environment 100 may include stereo equipment, amplifiers, pre-amplifiers and tuners that wirelessly connect to each other and other endpoints in the room. Speaker 124 is shown wirelessly receiving audio signals from TV 104 to output sound from the TV.

Other examples of endpoints include musical instruments, microphones, climate control systems, intrusion alarms, audio/video surveillance or security equipment, network attached storage, pet tracking collars, or other devices. As additional examples, endpoints may further include automobile audio head ends or DVD players, satellite music transceivers, noise cancellation systems, voice recognition systems, navigation systems, alarm systems, engine computer systems, or other devices.

Computer components themselves may be wirelessly connected endpoints such that memory, mass storage devices (e.g., disk drive, tape drive), input devices (e.g. keyboard 128, mouse 126), output devices (e.g., display screen, printer 120) and central processing units may be the endpoints. Mouse 126 and keyboard 128 are shown wirelessly connecting with a display screen or TV 104. Endpoints may also include components that make up the computing devices, such as circuitry, electronics, semiconductors, processing units, microelectronic circuits, etc. (e.g., computer components 130 shown in the cutaway view of a laptop 132).

Figure 2:
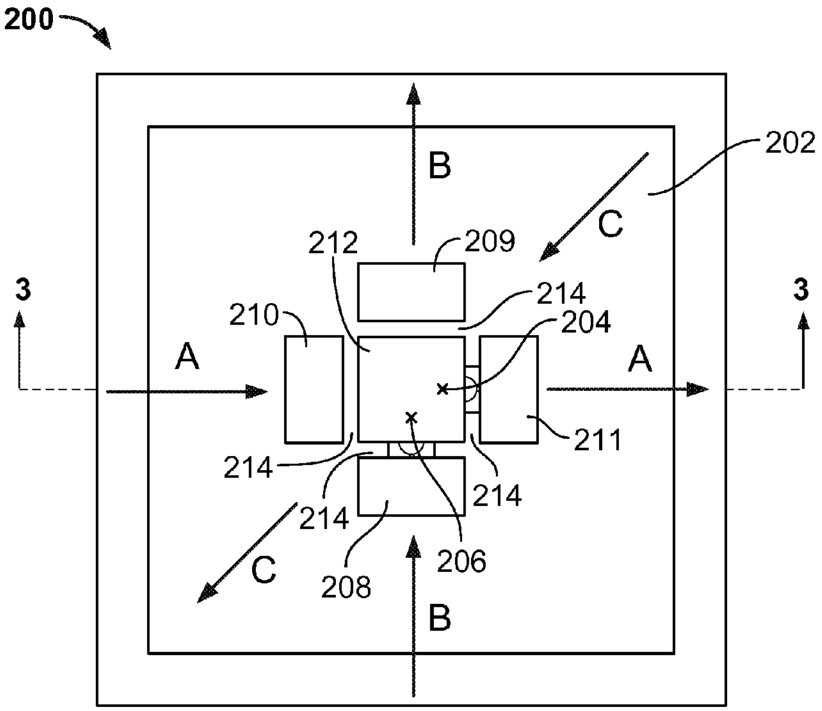
FIG. 2 is a schematic of an example of an antenna that can be implemented to connect the endpoints described above, as well as other endpoints.

FIG. 2 illustrates an example of an antenna 200 implemented to connect any of the endpoints described above, as well as additional, fewer or other endpoints. For purposes of explanation, the antenna 200 is a compact patch antenna positioned on a laminate substrate 202. Other kinds of antennas may also use the polarization switching described herein. The antenna 200, also known as a rectangular microstrip antenna, is a radio antenna with a low profile, which can be mounted on a flat surface. In general, the antenna includes a flat rectangular sheet or patch of metal, mounted over a larger sheet of metal called a ground plane.

The assembly may be contained inside a plastic radome, which protects the antenna structure from damage. The patch type antenna is simple to fabricate and easy to modify and customize to be used in various devices, such as any of the endpoints discussed above. Two metal sheets together form a resonant piece of microstrip transmission line with a length of approximately one-half wavelength of the radio waves. Other wavelengths may be used. The antenna 200 may be constructed on a dielectric substrate, using the materials and lithography processes used to make printed circuit boards.

The antenna 200 includes dual-linear polarization operation. For purposes of explanation the antenna operates at the millimeter or 60 GHz frequency band, although other frequencies may be used. To accomplish the dual-linearity, a first source or feed point 204 and a second source or feed point 206 are used to excite current in main patch 212. By feeding the antenna 200 from different locations two distinct modes of surface currents can be excited. Depending on the geometry of the antenna 200, the two modes can be made to radiate with polarizations in different directions, such as orthogonal to each other, e.g., one vertical and another horizontal. The two feed points 204 and 206 can be positioned at a 90 degree angle relative to each other as viewed from a vertical and horizontal axis of the main patch 212. Other angles may be used. For example, the second feed point 206 may be positioned at a 45 degree angle from a direction of polarization of the first feed point 204. Therefore, having more than one feed point 204 and 206 allows for dual-linearly polarized excitation alternatively in vertical and horizontal directions of the antenna 200. For example, when feed point 204 is powered the antenna 200 can be polarized in the horizontal direction A, and when feed point 206 is powered the antenna 200 can be polarized in the vertical direction B.

Power may be applied independently or simultaneously to the feed points 204 and 206. A controller, such as a computer processor, firmware and or software, may direct when and how current is directed to the feed points 204 and 206. For example, when power is applied only to first feed point 204, the polarization of antenna 200 is excited horizontally in direction A, and when power is applied only to the second feed point 206 the polarization is excited vertically in direction B. In addition, any other direction of polarization may be achieved when the feed points 204 and 206 are excited separately or together in combination.

The excitation current may be weighed with different phases or different magnitudes. For example, by applying a determined phase and current level to both the first feed point 204 and the second feed point 206 simultaneously, the polarization of antenna 200 may be excited in direction C. By applying the different magnitudes or phases of current to the feed points 204 and 206, different directions of polarization may be produced. The direction of polarization may be selected that achieves alignment of polarization between transmitting and receiving endpoints. The polarization of the antenna 200 may be affected by the orientation of the electric field (E-plane) of the radio wave with respect to the Earth's surface and may be determined by the physical structure of the antenna 200, the phase and power fed to the antenna 200 through feed points 204 and 206, and by an orientation of the antenna 200.

Due to the ability to achieve varying polarization angles, the antenna 200 may be incorporated on a same chip as integrated networking control circuitry without the need for external switches. Additionally or alternatively external switches may be used. Moreover, the antenna 200, control and electronics may be all integrated into a single package or die of the radio front end. This allows for the antenna 200, or an array of antennas 200 (e.g. focusing antenna array for high power), and control circuitry to be implemented in the same package substrate, without the need to be included on a printed circuit board. In other implementations, the antenna 200 may be constructed with printed circuit boards.

The antenna 200 may also include auxiliary or side patches 208, 209, 210, and 211 located on the sides of the powered main patch 212. In this example, four side patches 208, 209, 210 and 211 are used, but more or less side patches may be used, including the use of no side patches. In this example, the side patches 208, 209, 210 and 211 are rectangular in shape and positioned symmetrically around the main patch 212, but asymmetrically shaped or positioned main or side patches may also be used. A technical challenge is to increase or broaden the bandwidth of the antenna 200 while maintaining good isolation. Thus, the side patches 208, 209, 210, 211 are separated from the main patch 212 by slots 214 or an open space formed between the main patch 212 and the side patches 208, 209, 210, 211. The side patches 208, 209, 210, 211 parasitically load the main patch 212 to broaden the bandwidth of the antenna 200 while providing good isolation by minimizing the amount of energy that travels between side patches 208, 209 and side patches 210, 211. Parasitic coupling occurs, for example, at the adjacent edges of the main patch 212 and the side patches 208, 209, 210, 211, such as shown here between main patch 212 and side patches 208 and 211. The side patches 208, 209, 210, 211 may also generate a multiband response or improve the radiation characteristics of the antenna.

Figure 3:
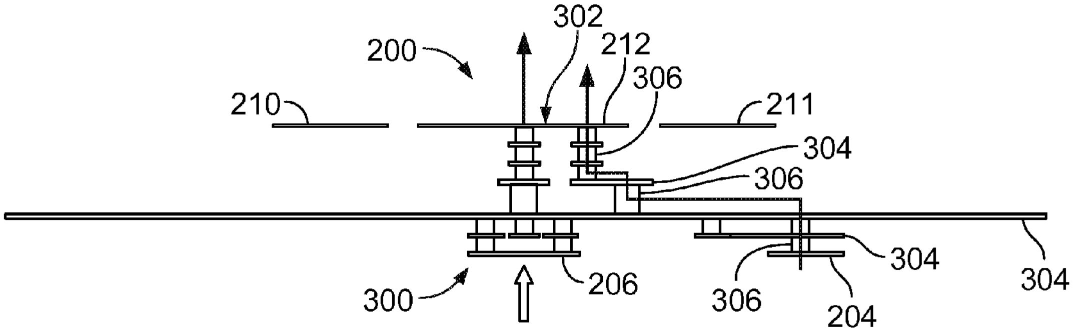
FIG. 3 is a schematic of an exemplary cross-sectional side view of the exemplary antenna of FIG. 2.

FIG. 3 shows a cross-sectional side view of the exemplary microstrip patch antenna 200 of FIG. 2, along line 3-3. The feed points 204 and 206 connect from ground 300 to antenna 302 by transmission lines 304 connected by vias 306. The arrows show a path of the current such as when feed point 204 or feed point 206 are excited. This configuration may allow for high yield during production since the vias 302 are spaced out and not positioned one over the other.

To send current to the antenna 200, feeding mechanisms include coax-type, aperture coupled-type, and edge microstrip-type, or through any other feeding technique used by microstrip and other antennas. As described, the main patch 212 and side patches 208, 209, 210, 211 may have shapes other than the ones shown in FIG. 2, and they include any number of slots, insets, protuberances, etc, to further improve impedance matching or the radiation properties. The antenna 200 may also be used in conjunction with multilayer substrate and superstrate techniques to improve gain, etc. or any other microstrip patch technique.

Figure 4:
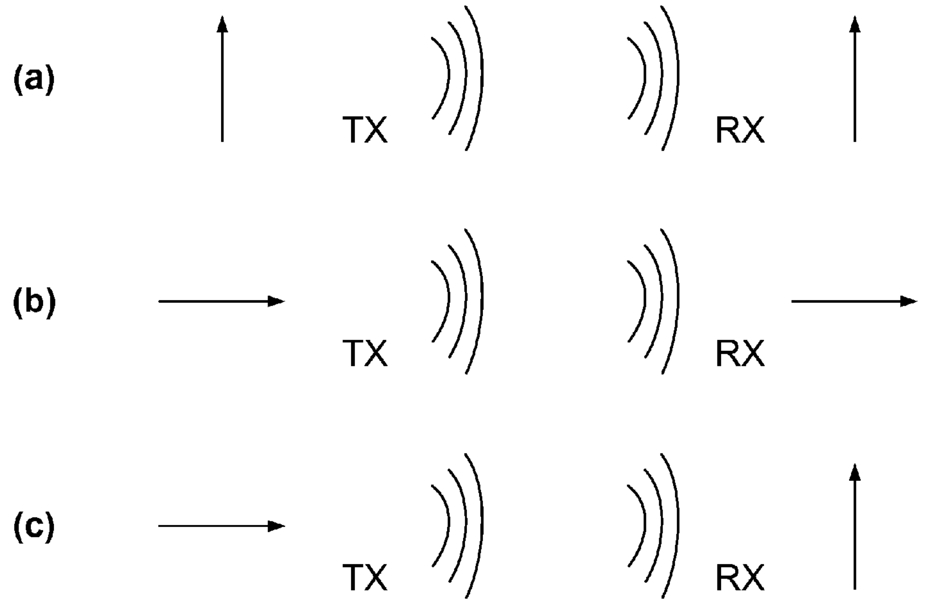
FIG. 4 shows examples of communication links between transmitters and receivers in different scenarios that may be handled by the antenna.

FIG. 4 shows examples of communication links between transmitters and receivers in different scenarios that may be handled by the antenna 200. In case (a) both the transmitter (TX) and receiver (RX) are aligned to vertical polarization, thus a good link signal-to-noise ratio may be achieved, to allow for a solid wireless connection. In the example of antenna 200, feed point 206 may be excited to produce the vertical polarization. In case (b) both the transmitter and receiver are both aligned to horizontal polarization, thus a good link signal-to-noise ratio may be achieved. In the example of antenna 200, feed point 204 may be excited to produce the horizontal polarization. In case (c) both the transmitter and receiver are misaligned because the transmitter is transmitting with horizontal polarization and the receiver is receiving with vertical polarization, causing cross polarization. In this case a very poor link signal-to-noise ratio may be attained and the link may easily be lost. Thus, if antenna 200 is used, feed point 204 or 206 may be excited to change the direction of polarization to match the direction of polarization of the other device, avoid cross polarization, and increase signal-to-noise ratio.

Cross-polarization is radiation orthogonal to the desired polarization. For instance, the cross-polarization of a vertically polarized antenna is the horizontally polarized fields. Alternatively, the antenna 200 may be used to help ensure cross-polarization, such as for a satellite connection. In order to allow more signals through the satellite transponder within a fixed bandwidth and with decreased interference, the satellite makers may alternate the polarization between adjacent transponder channels. Two adjacent channels may be next to each other and may interfere in a minimal way if they are polarized oppositely. Since interference affects customers, satellite vendors are typically careful about proper polarization, and monitor gaps, called guard bands to ensure that the polarization are properly aligned. A dual-linearly polarized antenna may be used to help ensure the proper polarization alignment to be cross-polarization.

Figure 5:
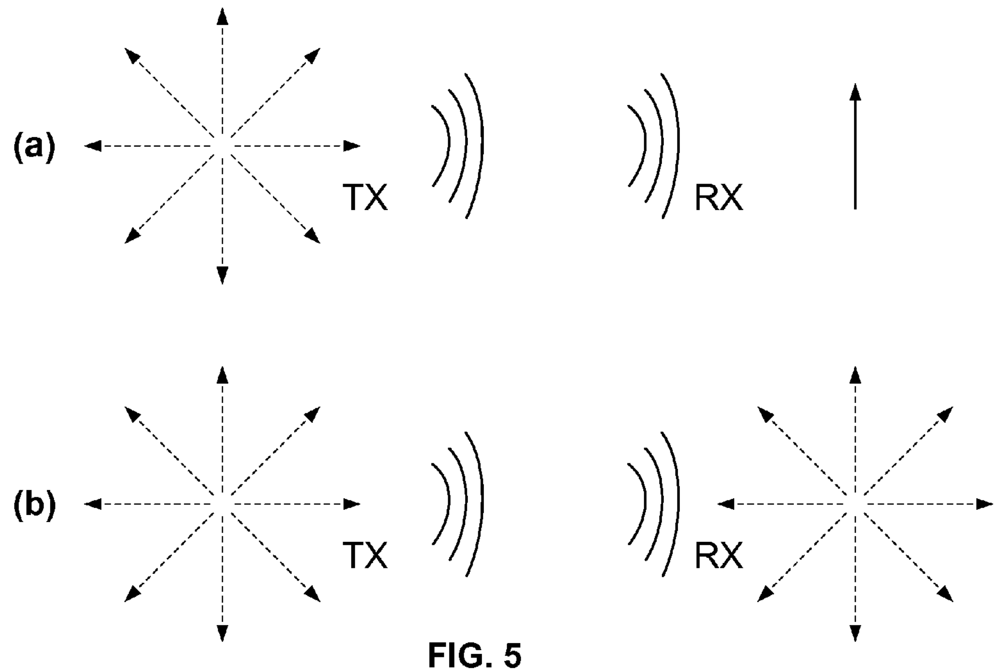
FIG. 5 shows an exemplary dual linearly polarized antenna being used to solve possible misaligned of polarization from the transmitter or receiver.

FIG. 5 shows the dual linearly polarized antenna 200 being used to solve possible misaligned of polarization from the transmitter or receiver. In case a), the transmitter includes a dual linearly polarized antenna 200, and therefore the polarization may be directed in the vertical direction to match the polarization of the receiving antenna. In case b) both the transmitter and the receiver include dual linearly polarized antennas 200, and therefore the polarization of the antennas may be selected to match each other. An advantage of using the proposed antenna 200 is that by properly phasing the two feeding points 204, 206 any polarization can be achieved (e.g. vertical, horizontal, +45 degrees, −45 degrees, or any other angle, including any circular polarization too).

As a result, the polarization of the transmitting antenna may be adjusted so that the link can always be maintained with a good signal-to-noise ratio independently of the polarization of the receiving end, or vice-versa. If the receiver includes a dual linearly polarized antenna 200, the polarization of the receiving antenna may be adjusted so that the link can always be maintained with a good signal-to-noise ratio independently of the polarization of the transmitting end. This scheme also works if the dual-linearly polarized antenna 200 is implemented for both ends of the link (e.g., both the transmitter and receiver).

For circular polarization, each feed point 204, 206 may radiate separately and combine to produce circular polarization. This feed condition may be achieved, for example, using a 90 degree hybrid coupler. When the antenna 200 is fed in this manner, the vertical current flow may be maximized as the horizontal current flow becomes zero, so the radiated electric field is vertical. One quarter-cycle later, the situation reverses and the field is horizontal. The radiated field is thus rotated in time, producing a circularly-polarized wave.

Figure 6:
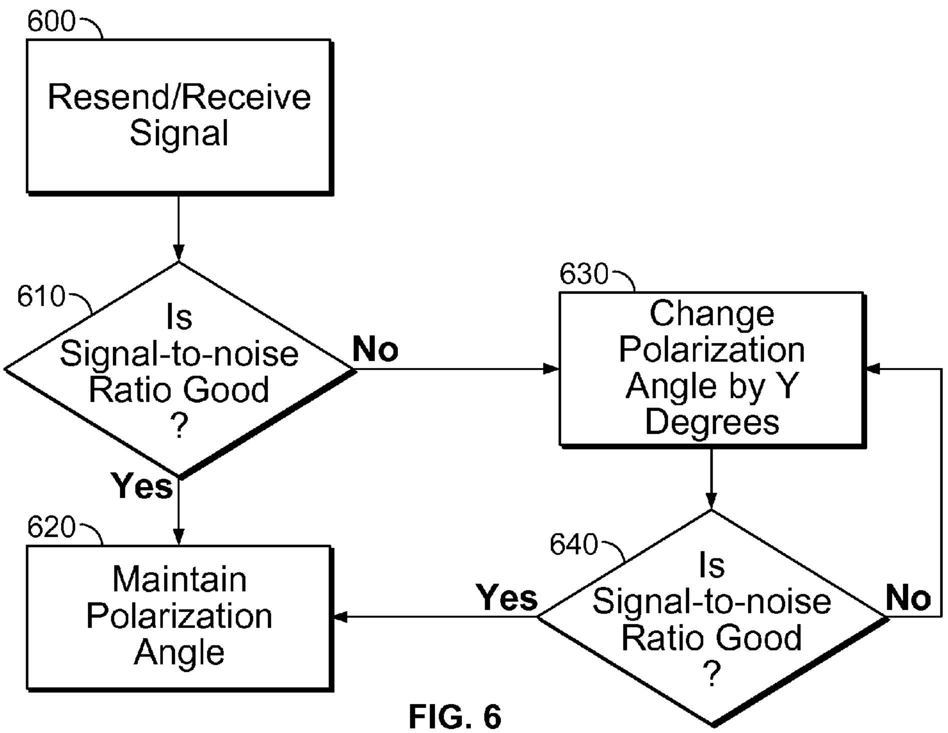
FIG. 6 is a flowchart showing exemplary logic for aligning polarization.

FIG. 6 is a flowchart showing an exemplary logic for setting a direction of polarization of antenna 200 to align the antenna 200 polarization with a polarization angle of an antenna at a target endpoint. In one example, at block 600 a signal is sent or received by antenna 200. At block 610, a signal-to-noise ratio is determined and compared to acceptable signal-to-noise ratios depending on an implementation. If the determined signal-to-noise ratio is good, at block 620 a polarization angle of the send or receive antenna is maintained. If the determined signal-to-noise ratio is outside a preferred range, at block 630 a polarization angle is changed by a determined number of Y degrees. For example, if the polarization was vertical, it may be changed by 90 degrees to horizontal by unexciting feed point 206 and exciting feed point 204 of antenna 200.

At block 640, the signal-to-noise ratio is checked again to determine if it is acceptable for the implementation. If the signal-noise-ratio, the polarization angle is maintained at block 620. Otherwise, the polarization angle is changed by a determined number of Y degrees at block 630. An algorithm may be used at block 630 to search for a satisfactory polarization angle in an optimized way. The process may continue until a satisfactory signal-to-noise ratio is discovered and maintained. The process may monitor the signal-to-noise ratio for any changes while the connection is made, and change the direction of polarization as needed as described above. The variable Y may be as large or as small as desired, and may change during operation of the endpoint, for example, to become smaller as the signal-to-noise ratio improves in order to fine tune the reception.

Additionally or alternatively, other factors may be considered to determine a preferred polarization angle to use. For example, logic of the antenna 200 may determine an identity of a device that it is about to connect with to communicate. The identity may be included in a message from the device to be connected with, and a check of a lookup table may determine a polarization angle of the antenna for that device. The polarization angle of the connecting or receiving antenna 200 may then be changed accordingly to match that of the device. Moreover, the direction of polarization may be determined and set during the manufacturing process, depending on a manufacture's desired direction of polarization for the antenna. The same antenna 200 may be used in different devices, but excitation of the feed points 204 and 206 may be set during manufacturing as determined by the manufacturer.

Figure 7:
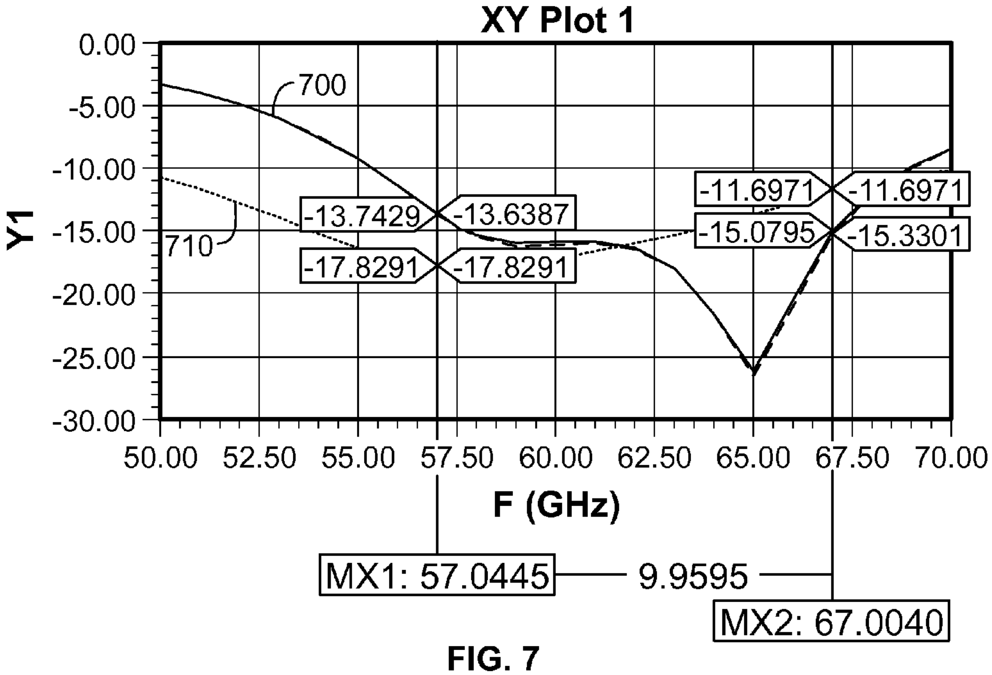
FIG. 7 is a plot showing an example return loss and isolation level results for an exemplary dual-linearly polarized antenna.

FIG. 7 illustrates exemplary return loss and isolation level results for a dual-linearly polarized antenna, such as antenna 200. The return loss 700 indicates an amount of energy that is realized at the antenna end when energy is applied to the feed points 204 and 206, with respect to energy radiated. It may be preferable to have a small return loss such as about −10 db or less. In this example, considering a band from 57 Ghz to 67 GHz (e.g., broadband), the return loss is −13 db or less.

In addition, the isolation level indicates the level of isolation between the first and second feed points 204 and 206, or in other words, how much energy is lost between the first and second feed points 204 and 206. It may be preferable to have a large isolation such as about 15 dB or larger. In this example, within the band from 57 Ghz to 67 GHz (e.g., broadband), the isolation is greater than 11 dB. Thus, this antenna 200 has very good impedance matching, impedance bandwidth, and radiation properties. The return loss is below about −13 dB across the band from 57 to 67 GHz, and the isolation level is above about 11 dB, up to 17 dB. A location of the feed points 204 and 206, thickness of the stack (e.g., dielectrics of antenna plane to the ground plane) and a shape of the patches may be varied to minimize the losses.

A symmetric shape of the patch antenna, such as the one shown in FIG. 2, may provide predictability of losses, because losses in one direction, such as the horizontal, may likely match losses in other directions, such as the vertical. In this example, the main patch 212 is generally square in shape and has dimensions of about a fourth of wavelength horizontally to a fourth of wavelength vertically. Side patches 210, 211 are generally rectangular in shape and have dimensions of about an eighth of wavelength horizontally to a fourth of wavelength vertically. Side patches 208, 209 are also generally rectangular in shape and have dimensions of about a fourth of wavelength horizontally to an eighth of wavelength vertically. Other shapes and sizes may be used. When designing shapes and sizes of the antennas, to test for isolation points, power can be applied to a feed point 204 or 206 and the antenna may be measured for currents. Those spots in which no current is detected may be possible high isolation points. This procedure may be used for other types of antennas too, such as antennas with non-symmetrical shapes, such as the one described in FIG. 10.

Figure 8:
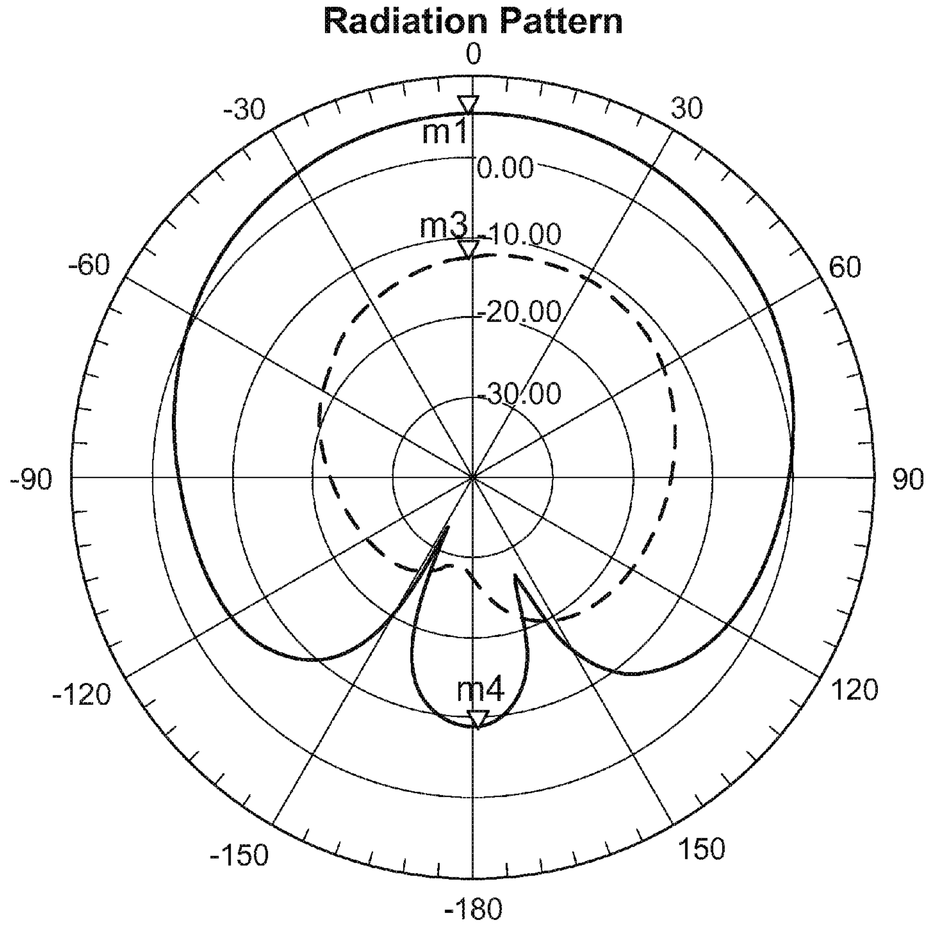
FIG. 8 is a radiation pattern showing an exemplary radiation pattern when only one of the two feed points is excited.
Figure 9:
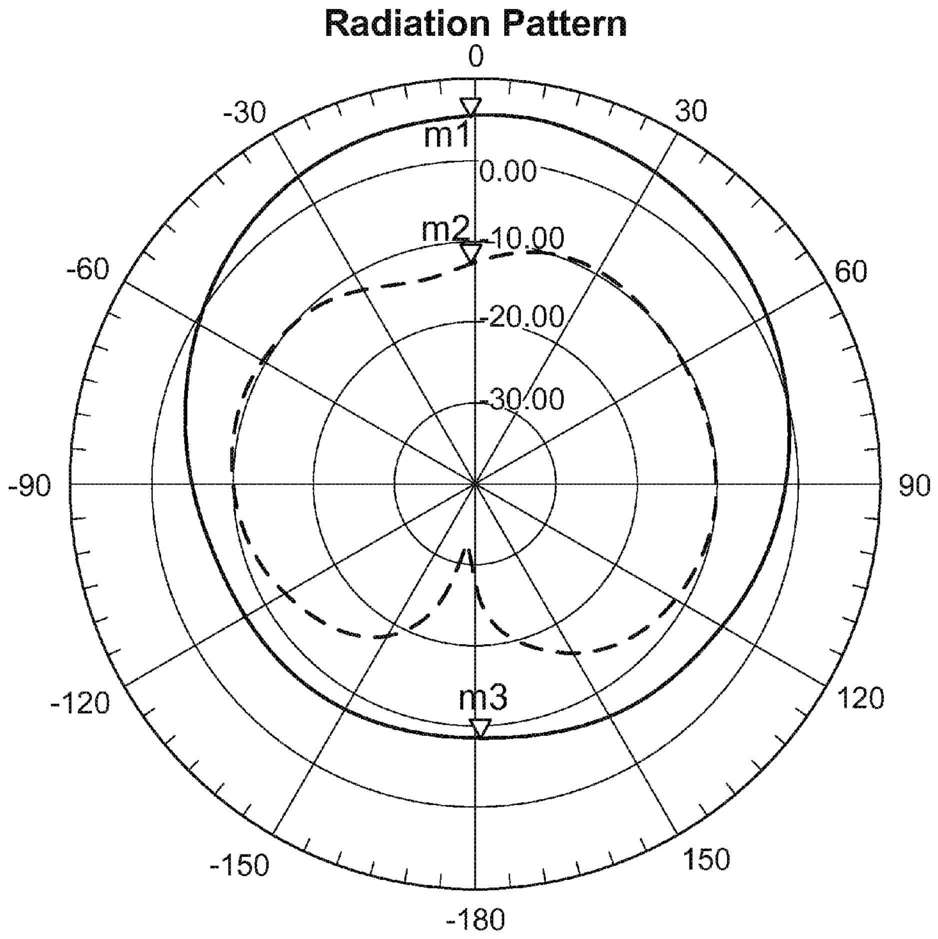
FIG. 9 is a radiation pattern showing an exemplary radiation pattern when the other of the two feed points is excited.

FIG. 8 is a plot showing an exemplary radiation pattern and gains when only one of the two feed points 204, 206 is excited. FIG. 9 is a plot showing an exemplary radiation pattern and gains when only one of the other two feed points 204, 206 is excited. The radiation pattern or antenna pattern graphically shows radiation properties of the antenna 200 as a function of elevation angle. That is, the antenna's pattern describes how this antenna 200 radiates energy out into space, or how it receives energy. Other antenna structures may display different radiation patterns depending on a shape and structure of the antenna. Such antennas may also incorporate the two feed points for control of a direction of polarization of the antenna.

As shown in FIGS. 8 and 9, the first feed 204 and the second feed 206 (e.g., port 1 and port 2) polarizations are different when only one of the feeds 204 or 206 is excited. The excited feed 204 or 206 shows a strong signal (shown by the solid line) and the non-excited feed 204 or 206 shows a weak signal (shown by the dotted line). Thus, the graphs in FIG. 8 and FIG. 9 show that there is a high purity between the different polarizations. In this particular example, the fields are linearly polarized and show a strong signal on the front side and a weak signal on the backside of the antenna 200. In addition, the antenna 200 is able to produce two orthogonally polarized beams from the two accessible ports. This is a desirable feature for switched-polarization diversity systems.

The gain of the antenna 200 is about 5.6 dBi. Gain is a parameter which measures the degree of directivity of the antenna's radiation pattern. A high-gain antenna may preferentially radiate in a particular direction. Specifically, the antenna gain, or power gain of an antenna may be determined as the ratio of the intensity (e.g., power per unit surface) radiated by the antenna in the direction of its maximum output. The gain of an antenna is typically a passive phenomenon such that power is not added by the antenna, but simply redistributed to provide more radiated power in a certain direction than would be transmitted by an isotropic antenna. An antenna designer may take into account the application for the antenna when determining the gain. The design of the antenna 200 may be modified to achieve different gains depending upon an implementation.

Depending on a desired gain and direction of energy, the antenna 200 may also be included within an array of antennas having similar or different designs to antenna 200. The array may include various types of arrays such as linear or rectangular (e.g., lattice). Depending on pattern that is desired to be radiated, the array may be used to focus power from the excitation of each of the antennas. Power to the leads 204 and 206 may be phased to constructively point the power of the array in a particular direction, such as towards a target endpoint device.

The phase of each antenna 200 within the array may be controlled together or separately with other antennas in the array depending upon an implementation and desired direction of the power. The direction of the power may be pointed to a specified target endpoint device or may also be varied such as to be used for focusing and scanning, to locate a target endpoint device. The direction of the power beam indicates where power is being sent and where the strongest sensitivity occurs. Therefore, when the antenna 200 is being operated in transmit mode, the array may focus power to a target to provide a strong signal to the target, and in receive mode the array may scan an environment to determine its position of greatest sensitivity to sending device.

Figure 10:
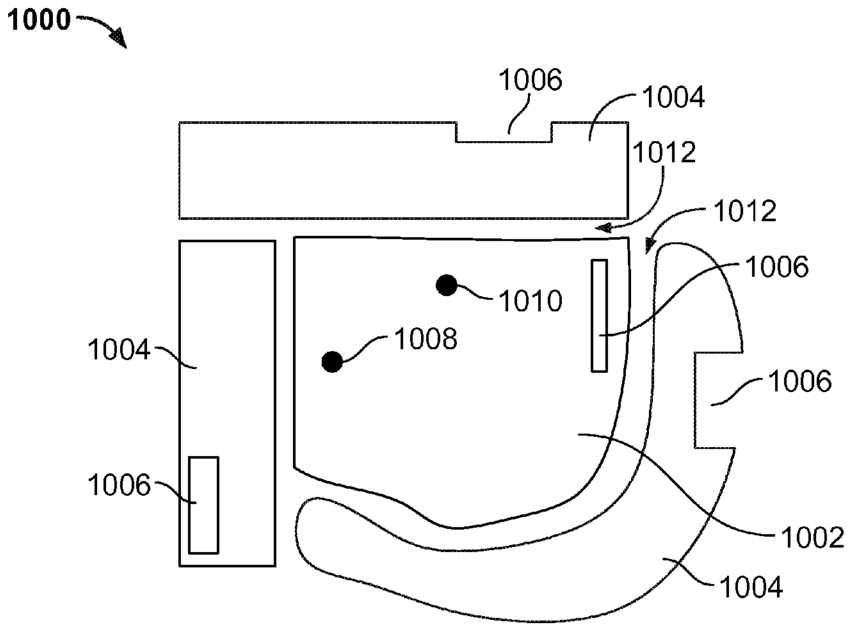
FIG. 10 is a schematic of another exemplary dual-linearly polarized patch antenna.

FIG. 10 shows another exemplary antenna 1000. The antenna may include any antenna that sends and receives signal via an electromagnetic field through the air or through space. The antennas described herein may be used as transmitters and receivers to convey information in systems including broadcast (e.g., audio) radio, television, mobile telephones, wireless personal area network (WPAN), WiFi wireless local area network (WLAN) data networks, trunk lines and point-to-point communications links (e.g., telephone, data networks), satellite links, remote controlled devices such as garage door openers, and wireless remote sensors, among many others. Radio waves may also used directly for measurements in technologies including RADAR, GPS, and radio astronomy. The antennas may be visible to a user or not (e.g., antennas inside phones, radios and laptop computer equipped). The antennas may be omnidirectional or only weakly directional which receive or radiate more or less in all directions, or directional or beam antennas which are intended to radiate or receive in a particular direction or directional pattern.

The antenna 1000, which for this example is also a patch antenna, includes a main patch 1002. The antenna 1000 may also include one or more auxiliary or side patches 1004 adjacent to the main patch 1002. The side patches may include symmetrical (like antenna 200 in FIG. 2) or asymmetrical shapes. In addition or alternatively, the antenna 1000 may include a combination of symmetrical and asymmetrical shapes. The main patch 1002, the side patches 1004, or both, may include slots 1006 (e.g., openings). The slots 1006 may help to broaden the bandwidth of the antenna structure by forcing current to travel longer distances for the antenna 1000 to work at a lower frequency. The main patch 1002 includes two feed points 1008 and 1010 to feed current to the main patch 1002. As described with regard to antenna 200, the feed points 1008 and 1010 may be excited alternatively or simultaneously.

The feed points 1008 and 1010 are positioned orthogonally or at another angle relative to each other, to provide for a dual-linearly polarized antenna. Excitation of one feed point 1008, 1010 may produce polarization in the horizontal direction and excitation of the other feed point 1008, 1010 may produce polarization in the vertical direction. In addition, different phases and magnitudes of power may be fed to the feed points 1008, 1010 to produce other directions of polarization, like 45 degrees and circular. Likewise, more than two feed points may also be used to produce polarization in other directions on the antenna 1000 when each is powered or excited alone or in different combinations. Moreover, open areas 1012 between the main patch 1002 and the side patches 1004 enable the side patches 1004 to receive current parasitically from the main patch 1002. The parasitic effect may couple and support current effectively between the main patch 1002 and side patches 1004 effectively extending an operational frequency of the antenna 1000.

Power may be fed to the antennas, such as antennas 200 and 1000, with different feeding mechanisms. The feeding mechanisms may include coax-type, aperture coupled-type, edge microstrip-type, or by any other known feeding technique used by microstrip antennas. The antennas may be composed of a main microstrip patch which is parasitically loaded by a number of auxiliary patches, in order to broaden the bandwidth of the antenna or to generate a multiband response or improve the radiation characteristics of the antenna. Both, the main patch and the auxiliary patches can have any arbitrary shape, and they can have any number of slots, insets, protuberances, etc., on it, to either further improve impedance matching or the radiation properties. The antennas may also be used in conjunction with multilayer substrate and superstrate techniques to improve gain, etc. or any other microstrip patch technique.

Figure 11:
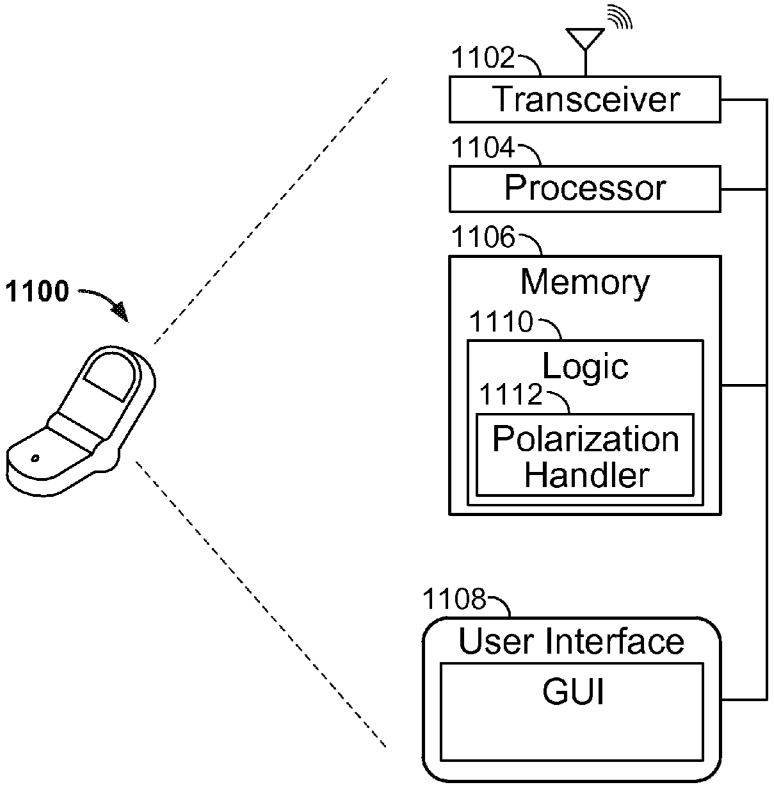
FIG. 11 is a block diagram of an example of an endpoint, in this instance a smartphone.

FIG. 11 shows an example of an endpoint 1100, in this instance a smartphone, that may use the antennas described above, or other antennas that include two or more feed points to produce varying directions of polarization. The endpoint 1100 includes a transceiver 1102 (e.g., transmitter and receiver) connected with an antenna such as antenna 200 or 1000, one or more computer processors 1104, a memory 1106, and a user interface 1108. The transceiver 1102 may be wireless transceiver, and the transmitted and received signals may adhere to any of a diverse array of formats, protocols, modulations, frequency channels, bit rates, and encodings that presently or in the future may support reverse direction protocols. Thus, the transceiver 1102 may support the 802.15.3, 802.15.4, the 60 GHz WLAN or WPAN specification, Bluetooth, Global System for Mobile communications (GSM), Time Division Multiple Access (TDMA), Frequency Division Multiple Access (FDMA), Code Division Multiple Access (CDMA), or other wireless access techniques or protocols.

The processor 1104 executes the logic 1110. The logic 1110 may be an operating system, application program, firmware, or other logic. The logic 1110 includes a polarization handler 1112 (or other response logic for handling polarization). The polarization handler 1112 may implement the processing noted above with respect to determination of a polarization direction for sending and/or receiving strong signals. For example, the polarization handler 1112 may determine which polarization direction to select to match the polarization of a connecting device.

In one example, a user of the smartphone 1100 desires to control one or more electronic devices, such as a coffee maker. At least one or both of the smartphone 1100 and the coffee maker include 60 Ghz antennas having adjustable polarization angles described herein. The user operates the smartphone 1100 and opens an application designed to control the coffee maker. The user may be at one end of a room and the coffee maker at the other end, such that signals from the smartphone may bounce in different directions before reaching the coffee maker. Likewise a polarization of the antenna in the smartphone may be positioned in one direction while the antenna in the coffee maker is positioned in another direction. For the coffee maker to receive an adequate control signal from the smartphone the polarization angles of the antennas should be substantially aligned. As long as either one or both the smartphone and the coffee maker include an antenna as described with adjustable polarization, the connection may be made with certainty.

The FCC and various regulators over the world have allowed the limits on transmit power and the Equivalent Isotropic Radiated Power (EIRP) to ensure the wireless transmission in the 60 GHz band. Thus, the large unlicensed bandwidth associated with a high allowable transmit power can enable multi-gigabit wireless communications. The 60 GHz or millimeter wave band has several other advantages. In addition to the large spectral capacity, the 69 GHz may be used with small antennas, and compact and light equipment. Moreover, at 60 GHz operating frequency, a whole range of applications in the area of consumer electronics devices may utilize this band for high data rate wireless applications. From uncompressed video distribution in the home, fast downloads of Gbytes of data at video kiosks, to Gbit/s wireless connections between laptops and printers.

The methods, devices, and logic described above may be implemented in many different ways in many different combinations of hardware, software or both hardware and software. For example, all or part of the endpoint 1100 may include circuitry in a controller, a microprocessor, or an application specific integrated circuit (ASIC), or may be implemented with discrete logic or components, or a combination of other types of circuitry. All or part of the logic may be implemented as instructions for execution by a processor, controller, or other processing device and may be stored in a machine-readable or computer-readable medium such as flash memory, random access memory (RAM) or read only memory (ROM), flash memory, erasable programmable read only memory (EPROM) or other machine-readable medium such as a compact disc read only memory (CDROM), or magnetic or optical disk.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A compact antenna, comprising:

a main antenna patch;

a first feed point and a second feed point connected with the main antenna patch to provide current to the main antenna;

wherein excitation of the first feed point produces polarization in a first direction along the main antenna patch and excitation of the second feed point produces polarization in a second direction different from the first direction; and an auxiliary antenna patch, the auxiliary antenna patch positioned adjacent to the main antenna patch, an open space formed between the main antenna patch and the auxiliary antenna patch, the auxiliary antenna patch parasitically loads the main antenna patch to broaden a bandwidth of the antenna.

2. The antenna of claim 1, wherein the first feed point or the second feed point is excited depending on a polarization of an antenna of a target device to avoid cross polarization.

3. The antenna of claim 1, wherein the auxiliary patch further comprises four side patches.

4. The antenna of claim 3, wherein the four side patches are symmetrically shaped and symmetrically positioned around the main antenna patch.

5. The antenna of claim 1 wherein the auxiliary antenna patch includes an asymmetrical shape.

6. The antenna of claim 1 wherein excitation of the first feed point and the second feed point create polarization in different directions depending on a magnitude or a phase of excitation.

7. The antenna of claim 1 wherein the first feed point and the second feed point, excited separately or together, accommodates alignment of a polarization of the antenna to a polarization direction of a target antenna.

8. The antenna of claim 1 wherein the antenna operates within a millimeter wave band.

9. The antenna of claim 1 wherein a first direction of polarization and the second direction of polarization comprise at least two of vertical, horizontal and circular polarizations.

10. The antenna of claim 1 wherein the first feed point and the second feed point are positioned at an orthogonal angle from each other in relation to an axis of polarization.

11. An endpoint device in communication with an other endpoint device, comprising:

an antenna connected with the endpoint device to send communication signals to the other endpoint device and receive communication signals from the other endpoint device, the antenna having a first feed point and a second feed point, the antenna comprising a main patch and at least one auxiliary patch, an open space being formed between the main patch and the auxiliary patch, the auxiliary patch parasitically loading the main antenna patch to broaden a bandwidth of the antenna;

an first electrical connector connected with the first feed point and a second electrical connector connected with the second feed point; and a controller connected with the endpoint device, the controller to direct excitation current to the first feed point and the second feed point, wherein excitation of the first feed point produces polarization in a first direction along the main patch and excitation of the second feed point produces polarization in a second direction different from the first direction.

12. The system of claim 11, wherein the first feed point or the second feed point is excited depending on a determined polarization direction of the antenna.

13. The system of claim 12, wherein the polarization direction is determined that avoids cross polarization with the other endpoint device.

14. The system of claim 11, wherein the auxiliary patch comprises four auxiliary patches of the same size and shape positioned symmetrically around the main patch.

15. The system of claim 11 wherein excitation of the first feed point and the second feed point create polarization in different directions depending on a magnitude or a phase of excitation.

16. A method for setting a desired direction of polarization of an antenna, comprising:

exciting a first feed point with a current;

exciting a second feed point with a current separately or together with the excitation of the first feed point; and wherein excitation of the first feed point produces polarization in a first direction along the antenna, excitation of the second feed point produces polarization in a second direction different from the first direction, and excitation of the first feed point and the second feed point together produces polarization in a third direction different than both the first direction and the second direction; and parasitically loading a main antenna patch included in the antenna using an auxiliary antenna patch included in the antenna to broaden a bandwidth of the antenna, the auxiliary antenna patch positioned adjacent to the main antenna patch so that an open space is formed between the main antenna patch and the auxiliary antenna patch.

17. The method of claim 16 further comprising determining a direction of polarization of an antenna of a target endpoint to set a desired direction of polarization.

18. The method of claim 17 further comprising monitoring a signal-to-noise ratio to determine the direction of polarization.

19. The method of claim 16, wherein the auxiliary patch comprises four side patches.

20. The method of 19, wherein the four side patches are symmetrically shaped and symmetrically positioned around the main antenna patch.

* * * * *